US007019297B2

(12) United States Patent
Aykac et al.

(10) Patent No.: US 7,019,297 B2
(45) Date of Patent: Mar. 28, 2006

(54) DETECTOR ARRAY USING INTERNALIZED LIGHT SHARING AND AIR COUPLING

(75) Inventors: Mehmet Aykac, Knoxville, TN (US); Matthias J. Schmand, Lenoir City, TN (US); Niraj K. Doshi, Knoxville, TN (US); Charles W. Williams, Powell, TN (US); Ronald Nutt, Knoxville, TN (US)

(73) Assignee: CTI PET Systems, Inc., Knoxville, TN (US)

( * ) Notice: Subject to any disclaimer, the term of this patent is extended or adjusted under 35 U.S.C. 154(b) by 129 days.

(21) Appl. No.: 10/441,681

(22) Filed: May 20, 2003

(65) Prior Publication Data

US 2004/0232342 A1 Nov. 25, 2004

(51) Int. Cl.
*G01T 1/202* (2006.01)

(52) U.S. Cl. ...................................... 250/368; 250/367

(58) Field of Classification Search ................ 250/368, 250/367, 363.01, 363.02, 363.03, 363.04, 250/363.06, 370.01, 370.07, 370.09
See application file for complete search history.

(56) References Cited

U.S. PATENT DOCUMENTS 3,936,645 A 2/1976 Iversen
4,914,301 A 4/1990 Akai
4,982,096 A 1/1991 Fujii et al.
5,059,800 A 10/1991 Cueman et al.
5,091,650 A * 2/1992 Uchida et al. .............. 250/366
5,329,124 A * 7/1994 Yamamoto et al. ......... 250/367
5,453,623 A * 9/1995 Wong et al. ........... 250/363.03
5,773,829 A * 6/1998 Iwanczyk et al. ........... 250/367
6,087,663 A * 7/2000 Moisan et al. .............. 250/367
6,292,529 B1 9/2001 Marcovici et al.
6,344,649 B1 * 2/2002 Riedner et al. ............. 250/367
6,552,348 B1 * 4/2003 Cherry et al. .......... 250/363.03
6,841,783 B1 * 1/2005 Malmin ...................... 250/368

* cited by examiner

*Primary Examiner*—Otilia Gabor

(57) ABSTRACT

A method for fabricating an array adapted to receive a plurality of scintillators for use in association with an imaging device. The method allows the creation of a detector array such that location of the impingement of radiation upon an individual scintillator detector is accurately determinable. The array incorporates an air gap between all the scintillator elements. Certain scintillators may have varying height reflective light partitions to control the amount of light sharing which occurs between elements. Light transmission is additionally optimized by varying the optical transmission properties of the reflective light partition, such as by varying the thickness and optical density of the light partitions. In certain locations, no light partitions exist, thereby defining an air gap between those elements. The air gap allows a large increase in the packing fraction and therefore the overall sensitivity of the array.

14 Claims, 8 Drawing Sheets

DETECTOR ARRAY USING INTERNALIZED LIGHT SHARING AND AIR COUPLING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a method for fabricating a detector array for use in imaging applications such as X-ray imaging, fluoroscopy, positron emission tomography (PET), single photon emission computed tomography (SPECT), computed tomography (CT), gamma camera and digital mammography systems. More particularly, the present invention provides a simple approach for fabricating a detector array with high packing fraction resulting in greater sensitivity while still maintaining spatial resolution.

2. Description of the Related Art

In the field of imaging, it is well known that imaging devices incorporate a plurality of scintillator arrays for detecting radioactivity from various sources. It is also common practice, when constructing scintillator arrays composed of discrete scintillator elements, to pack the scintillator elements together with a reflective medium interposed between the individual elements fully covering at least four sides of the scintillator element. The reflective medium serves to collimate the scintillation light to accurately assess the location at which the radiation impinges upon the detectors. The reflective medium further serves to increase the light collection efficiency from each scintillator element as well as to control the cross-talk, or light transfer, from one scintillator element to an adjacent element. Reflective mediums include reflective powders, reflective film, reflective paint, or a combination of materials.

Conventionally, scintillator arrays have been formed from polished crystals that are either hand-wrapped in reflective PTFE tape and bundled together, or alternatively, glued together using a white pigment such as $BaSO_4$ or $TiO_2$ mixed with an epoxy or RTV.

Another approach utilizes individual reflector pieces that are bonded to the sides of the scintillator element with the aid of a bonding agent. This process requires iterations of bonding and cutting until a desired array size is formed.

Other devices have been produced to form an array of scintillator elements. Typical of the art are those devices disclosed in the following U.S. Patents:

| Patent No. | Inventor(s) | Issue Date |
| --- | --- | --- |
| 3,936,645 | A. H. Iverson | Feb. 3, 1976 |
| 4,914,301 | Y. Akai | Apr. 3, 1990 |
| 4,982,096 | H. Fujii et al. | Jan. 1, 1991 |
| 5,059,800 | M. K. Cueman et al. | Oct. 22, 1991 |
| 6,292,529 | S. Marcovici et al. | Sep. 18, 2001 |

Of these patents, the '645 patent issued to Iverson discloses a radiation sensitive structure having an array of cells. The cells are formed by cutting narrow slots in a sheet of luminescent material. The slots are filled with a material opaque to either light or radiation or both. The '800 patent issued to Cueman et al., discloses a similar scintillator array wherein wider slots are formed on the bottom of the array.

Most of the aforementioned methods also require a separate light guide attached to the bottom of the detector array to channel and direct the light in a definitive pattern on to a receiver or set of receivers such as photomultiplier tubes or diodes. This light guide usually contains cuts in varying depths to alter the light pattern on the receivers. This additionally complicates the fabrication of the entire detector.

Wong, W. H. et al., in "An Elongated Position Sensitive Block Detector Design Using the PMT Quadrant-Sharing Configuration and Asymmetric Light Partition," *IEEE Transactions on Nuclear Science*, Vol. 46, No. 3, 542–545 (1999), discloses a block design wherein seven (7) monolithic BGO slabs are painted with light-blocking reflective patterns on their boundaries. The slabs are then glued together to form a block. The block is then cut orthogonally with respect to the glued seams and painted and glued again in like fashion. A 7×7 array is thus defined. The reflective patterns are unclear from the disclosure, but appear to be defined such that the reflective areas increase toward the central portion of the array.

BRIEF SUMMARY OF THE INVENTION

The present invention is a detector array for use in imaging applications such as X-ray imaging, fluoroscopy, positron emission tomography (PET), single photon emission computed tomography (SPECT), computed tomography (CT), gamma camera and digital mammography systems. The detector array of the present invention includes a plurality of scintillators for use in association with an imaging device. The array is fabricated such that the location of the impingement of radiation upon an individual scintillator detector is accurately determinable. This method allows an efficient, consistent, accurate, and cost-effective process for creating an array with high packing fraction, high light output, and high sensitivity. This method introduces internalized reflective light partitions between the scintillator elements themselves thereby eliminating the need for cuts in the attached light guide. Therefore, a continuous light guide may be used in conjunction with this array, simplifying the entire detector array fabrication process.

The array defines an M×N array of scintillator elements. At least a portion of the scintillator elements are individually encircled by a reflective light partition. The light partitions are of varying heights in order to control the amount of light sharing that occurs between adjacent elements. In addition to or in lieu of varying the height of the light partitions, the light transmission is optimized by varying the optical transmission properties of the reflective light partition, such as, but not limited to, varying the thickness of the light partitions, and varying the optical density of the light partitions. The reflective light partition is fabricated from one of several materials such as films, powders, paints, plastics, or metals. The materials of manufacture are selected depending on the wavelength of light emitted by the scintillator and the characteristics of transmissivity and reflectance that is needed. In certain locations, no light partitions exist, thereby defining an air gap between those elements.

In one embodiment, reflective film is cut to a selected height and bonded to the individual elements. Various elements define different height film attached to the different surfaces, thereby allowing the control of light sharing between elements. Selected elements have no film bonded thereto. The elements are then formed into an array in a predetermined order. Once the individual elements are prepared, the elements are placed together in an array in a friction fit without necessitating a bonding agent, thereby maintaining an air gap between the elements. A variant of this embodiment would be to use no adhesive to bond the reflective light partition to the elements, thereby maintaining an air gap in between the light partition and scintillator element as well.

In an alternate embodiment, an injection molded grid with varying wall heights is used. Other methods of manufacture include using fused deposition modeling, SLA techniques, hand assembly, and other conventional manufacturing processes. In the injection molding process, the grid array is fabricated using a raw material in the form of pellets formed by blending a combination of polypropylene, titanium dioxide, barium sulfate, silicon dioxide, calcium carbonate, aluminum oxide, magnesium oxide, zinc oxide, zirconium oxide, talcum, alumina, Lumirror®, Teflon® (PTFE), calcium fluoride, silica gel, polyvinyl alcohol, ceramics, plastics, films and optical brightener. The materials of manufacture of the grid array are selected depending on the wavelength of light emitted by the scintillator in order to accomplish the highest degree of reflectance at the chosen wavelength. In this method, no adhesive or bonding material is required between the elements and the reflective light partition. The injection molded grid is fabricated such that the elements are held by frictional force. The elements in the center of the grid have no light partitions in between them such that an air gap is defined between the entirety of the adjacent scintillator element faces.

In yet another embodiment, vapor deposition of a very thin metallic coating such as silver or aluminum is used as the reflective light partition between selected scintillator elements. Selected elements are coated with the substrate and then placed together maintaining the air gap between the elements. The vapor deposition is accomplished through several potential processes including thermal evaporation, e-beam evaporation, and ion sputtering. The thickness and height of the vapor deposition is adjusted to optimize the transmission properties between adjacent elements in order to obtain a clearly identifiable position profile map.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A detector array for use in imaging applications such as X-ray imaging, fluoroscopy, positron emission tomography (PET), single photon emission computed tomography (SPECT), computed tomography (CT), gamma camera and digital mammography systems is provided. The detector array is illustrated at 10 in the figures. The detector array, or array 10, includes a plurality of scintillator elements 12 for use in association with an imaging device (not illustrated). The array 10 is fabricated such that location of the impingement of radiation upon an individual scintillator element 12 is accurately determinable. The present invention provides for the creation of a highly packed, high light output, high sensitivity, scintillator array 10 in an efficient, consistent, accurate and cost-effective manner.

Figure 1:
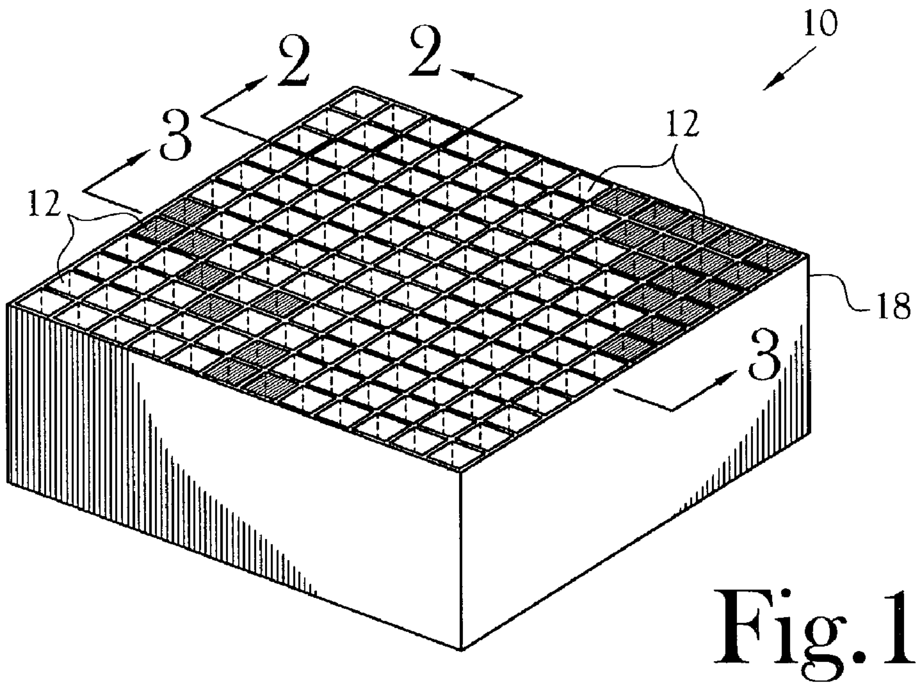
FIG. 1 is a perspective illustration of the detector array of the present invention.

As best illustrated in FIG. 1, the array 10 defines an M×N array of scintillator elements 12. In the illustrated embodiment, the array 10 defines a 12×12 matrix of scintillator elements 12. However, it will be understood that "M" and "N" are independently selectable, with "M" being less than, equal to, or greater than "N". It will be understood that, while the array 10 is illustrated as defining square scintillator elements 12 of similar size in cross-section, it will be understood that the scintillator elements 12 of the present invention are not limited to this configuration. The scintillator elements 12 define a cross-section of one or a combination of more than one geometric configuration such as circular, triangular, rectangular, hexagonal, and octagonal.

A mechanism 18 for maintaining the relative positions of the individual scintillator elements 12 with respect to each other is provided. In the illustrated embodiment of FIG. 1, the mechanism 18 is a retainer disposed about the outermost scintillator elements 12 to maintain the relative positions of the individual scintillator elements 12. The retainer 18 is fabricated from conventional materials such as shrink wrap, rubberized bands, tape or a combination of like materials may be used to enclose or hold the array together in a tight, uniform fashion. Although illustrated as spanning the entire height of the array 10, the retainer 18 may in some applications include one or more retainers 18 which span only a portion of the height of the array 10.

Figure 3:
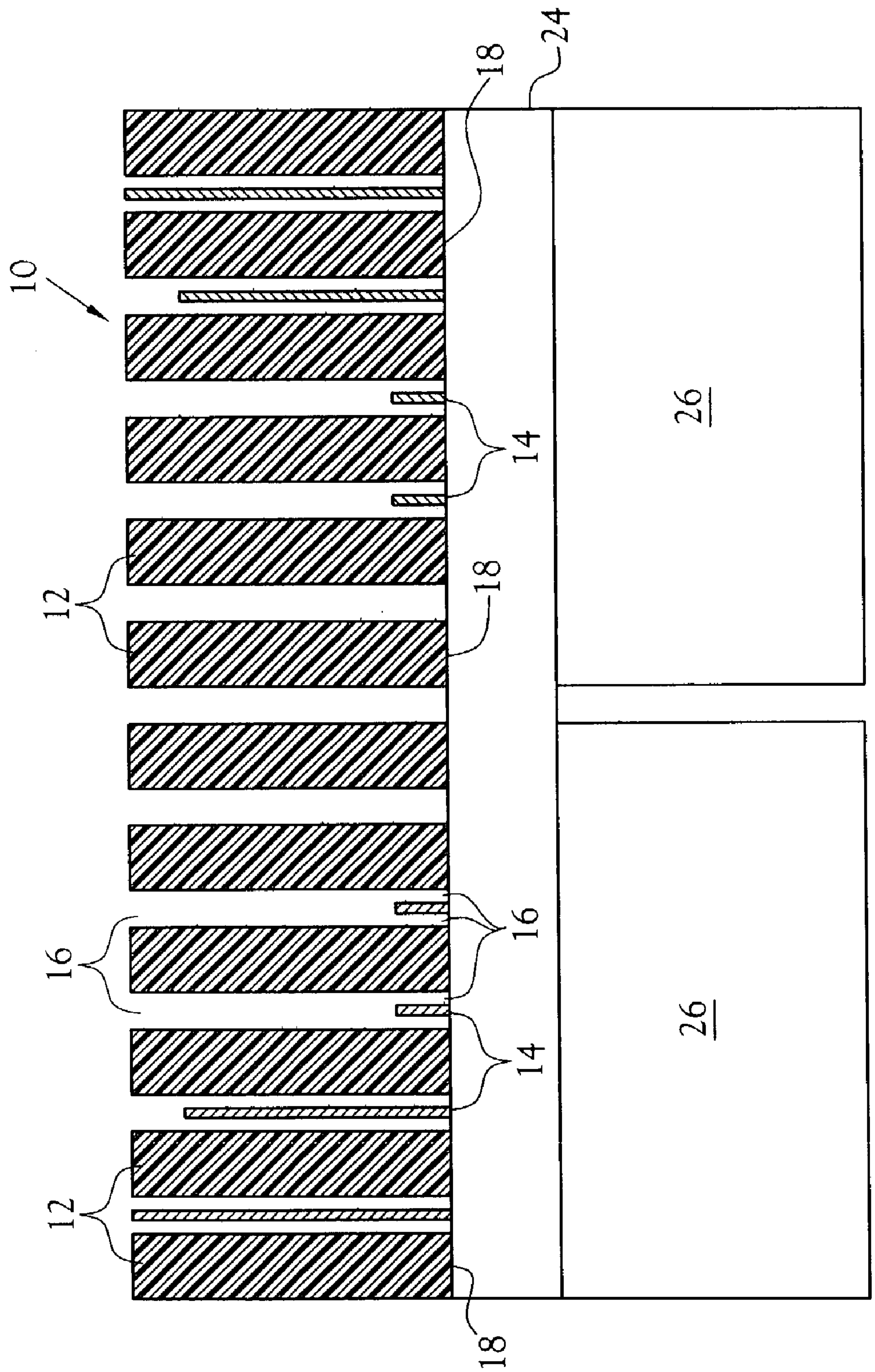
FIG. 3 is an elevation view of the detector array of the present invention, in section, taken along lines 3—3 of FIG. 1.
Figure 3A:
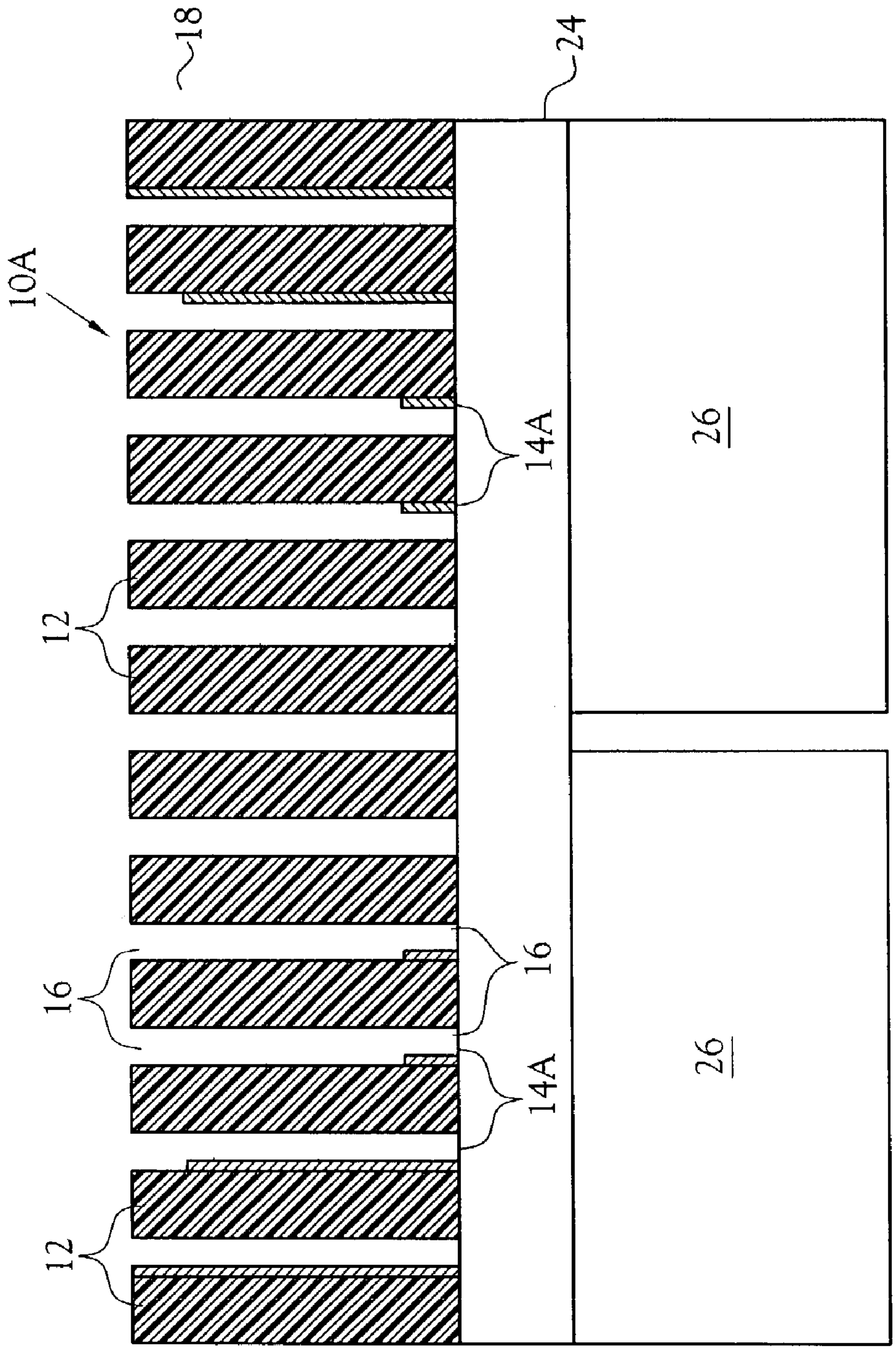
FIG. 3A is an elevation view of an alternate embodiment of the detector array of the present invention, in section, taken along lines 3—3 of FIG. 1.

In the embodiments illustrated in FIGS. 3 and 3A, the mechanism 18 is a bonding agent applied between one end of each scintillator element 12 and a light guide 24. As discussed below, the light guide 24 is not required in all applications. Accordingly, although not illustrated, in those applications the scintillator elements 12 are bonded to the photodetectors 26.

It will be understood that while these specific mechanisms 18 are described, other mechanisms 18 such as, but not limited to, axial compression applied to the scintillator elements 12 may be used as well.

Figure 2:
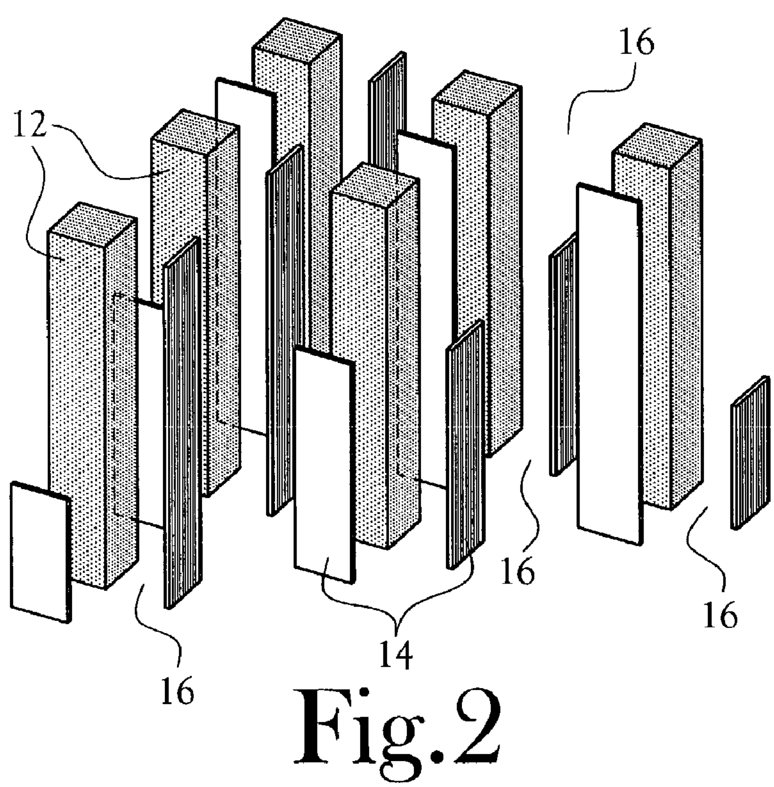
FIG. 2 is an exploded view of a portion of the detector array of the present invention taken at 2—2 of FIG. 1.

Referring to FIGS. 2 and 3, a variable height reflective light partition 14 is provided between selected scintillator elements 12. In the illustrated embodiment, the light partitions 14 extend from the bottom surface of the array 10 and terminate toward the top surface. The height of the light partitions 14 gradually decrease from the outermost light partitions 14 to the center of array 10, where no light partitions 14 are provided. The light partitions 14 are applied or placed in the array 10 at any selected locations between the scintillator elements 12 in order to optimize the resultant position profile map. While the light partitions 14 are illustrated and described as extending from the bottom surface of the array 10, it will be understood that the light transmission between the scintillator elements 12 is optimizable by varying the placement of the light partitions 14 at any selected vertical position between the scintillator elements 12.

Although not illustrated, the light transmission is optimized, in addition to or in lieu of varying the height of the light partitions 14. Specifically, the light transmission is optimized by varying the optical transmission properties of the reflective light partitions 14, such as, but not limited to, varying the thickness of the light partitions 14, and varying the optical density of the light partitions 14.

FIG. 2 illustrates an exploded view of several scintillator elements depicted at 2—2 in FIG. 1. Between selected other scintillator elements 12 an air gap 16 is formed between the scintillator elements 12. The existence or non-existence of a light partition 14 dictates the amount of light sharing that occurs between scintillator elements 12. No bonding agent is used between scintillator elements 12. The air gap 16 between the scintillator elements 12, regardless of the presence of partial reflector partitions 14, serves to control the transmission used for early light sharing and reflection of the scintillation light within the scintillator elements 12. The air gap 16 changes the total angle of reflection due to the significant index of refraction change, which results in an increase in the number of photons reflected at the crystal surface and minimizes the number of photons absorbed in the scintillator elements 12 as discussed above.

Illustrated in FIG. 3 is a cross-sectional view of the detector array 10 in FIG. 1. The air gaps 16, exaggerated for clarity, are defined between scintillator elements 12 where no reflective light partition 14 is present and between the scintillator elements 12 and the light partitions 14 as a result of there being no bonding between the light partition 14 and the scintillator elements 12 in the array 10. An air gap 16 is also defined between scintillator elements 12 between which no reflective light partition 14 exists. This air gap 16 serves to maximize light output as a result of minimizing loss of light into the light partition 14 of the array 10 as well as increasing the overall packing fraction of the detector array 10 to greater than 95%.

The light partitions 14 of the array 10 are fabricated using one or more of a variety of processes utilizing materials including reflective powders, plastics, paints, polyvinyl alcohol, ceramics, films, and other highly reflective components. The light partitions 14 are dimensioned at various lengths and thicknesses to accommodate various sized scintillator elements 12, as well as to optimize transmission properties. In the illustrated embodiment, the array 10 is constructed to have parallel scintillator elements 12 to define a substantially planar array 10. In an alternate embodiment (not illustrated) the scintillator elements 12 are configured to define an array having an arcuate configuration.

FIG. 3A illustrates an embodiment of the detector array 10A of the present invention wherein the light partitions 14A are fabricated from 3M VM2000® reflective film. The film is cut to varying heights and attached to the different sides of single scintillator elements 12 based on their location in the array 10A. The scintillator elements 12 are arranged in a M×N array without adhesives forming an air gap 16 between scintillator elements 12. As illustrated, the air gaps 16 are defined between scintillator elements 12 where no light partition 14A is present, and between the light partitions 14A attached to scintillator elements 12 and an adjacent side of a scintillator element 12 to which no light partition 14A is attached.

As discussed above, the scintillator elements 12 illustrated in FIGS. 3 and 3A are bonded to a light guide 24 using a bonding agent 18. The light guide 24 is positioned above a plurality of photodetectors 26. The thickness and material of the light guide 24 is selected to optimize the light guide 24 for the geometrical set up of the photodetectors 26 and the light emission properties of the scintillator elements 12, respectively. Alternatively, although not illustrated, the scintillator elements 12 are bonded directly to the photodetector 26 where no light guide 24 is required. The photodetector 26 is selected from, but not limited to, a photomultiplier tube, an avalanche photodiode, a pin diode, a CCD, or other solid state detector. In this arrangement, the detectors 12 disposed within the array 10 serve to detect an incident photon and thereafter produce a light signal corresponding to the amount of energy deposited from the initial interaction between the photon and the scintillator element 12. The structure of the array 10 serves to reflect and channel the light down the scintillator element 12, through the light guide 24, when provided, and to the coupled photodetector 26. The signal generated by the photodetector 26 is then post-processed and utilized in accordance with the purpose of the imaging device.

Figure 4:
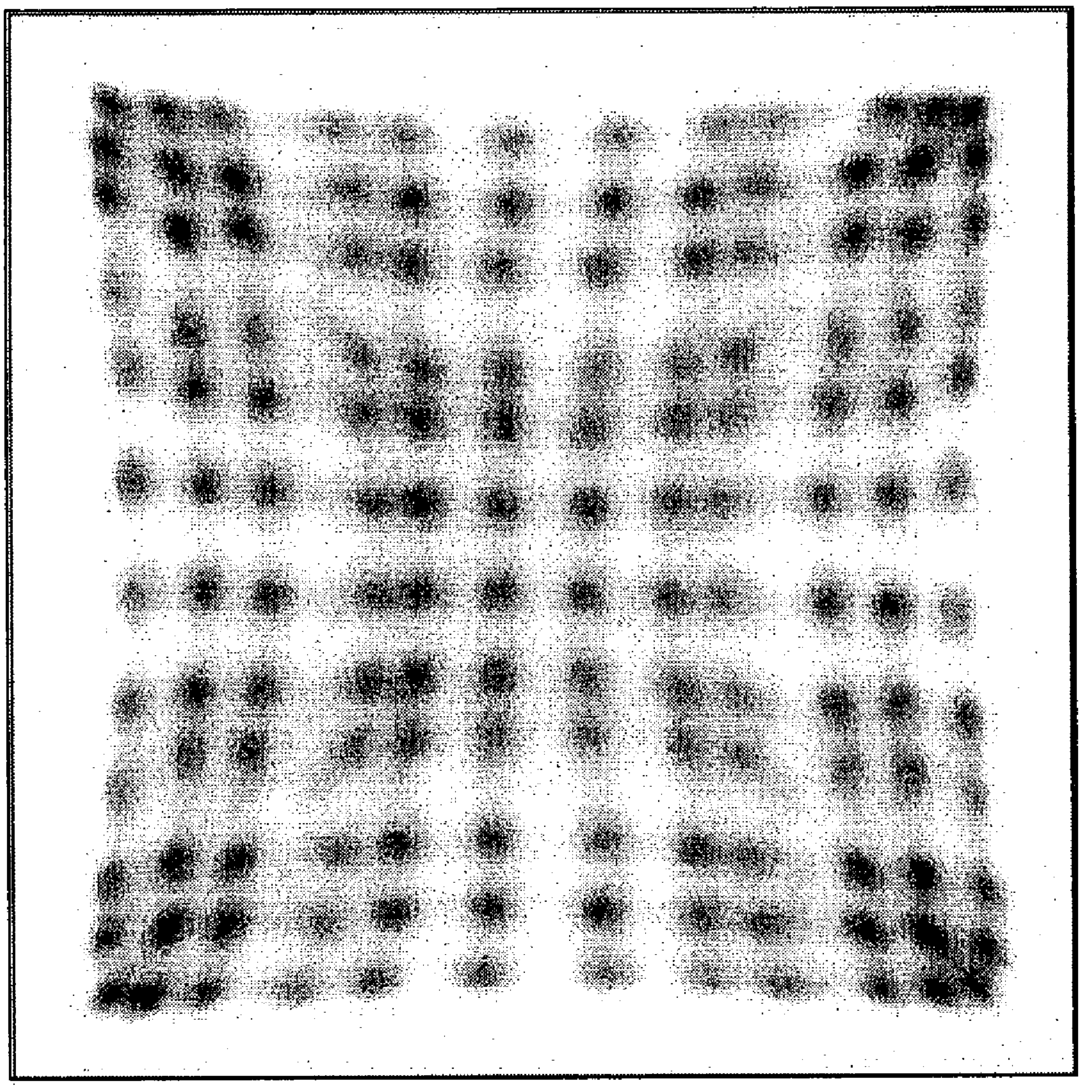
FIG. 4 is a position profile map acquired by flood irradiating the array with a radioactive point source.
Figure 5:
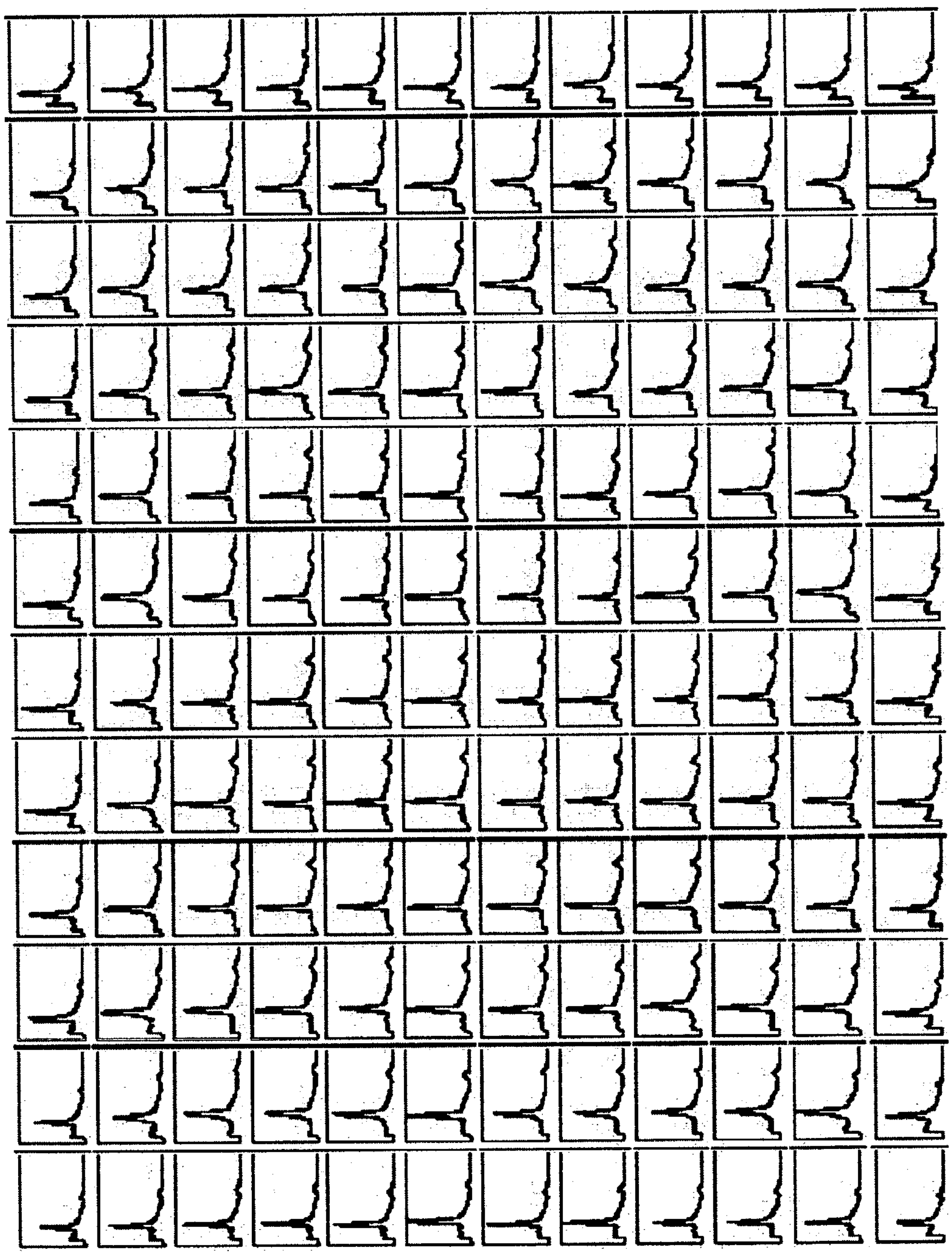
FIG. 5 is an energy resolution map of the array shown in FIG. 4.

FIG. 4 depicts a position profile map obtained with a detector array 10 defined by a 12×12 matrix of scintillator elements 12 when irradiated with a radioactive point source. The individual element resolution map is illustrated in FIG. 5. The average energy resolution for the LSO scintillator elements at 511 keV was measured to be 13% across the array 10.

Figure 6:
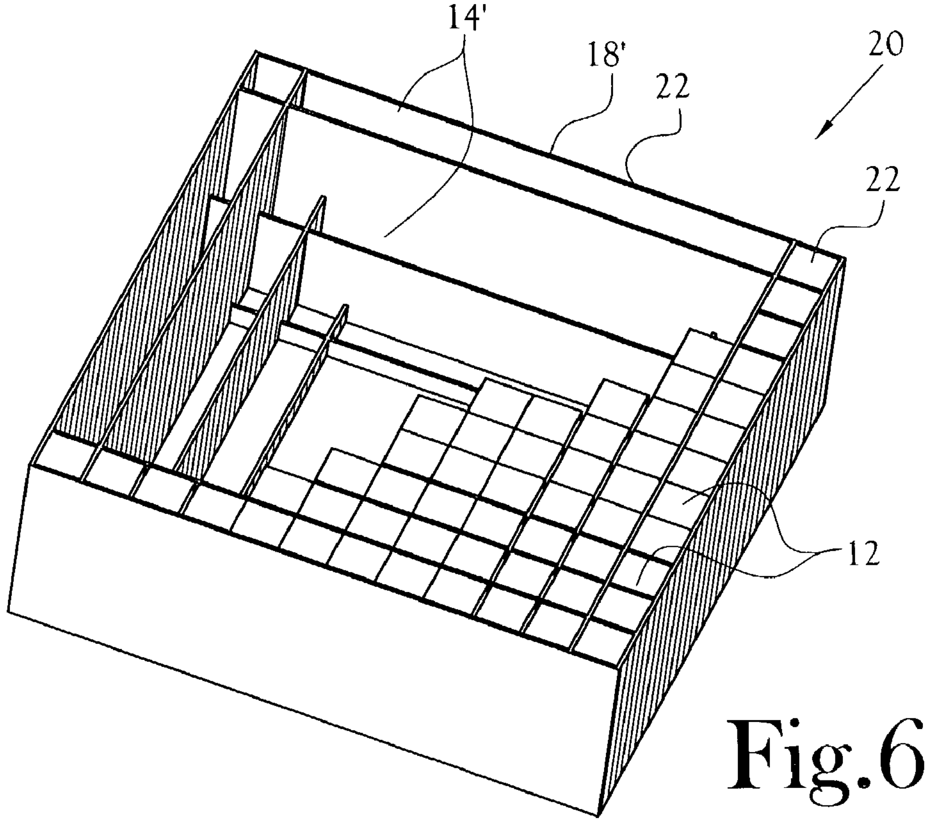
FIG. 6 is a perspective illustration of a partially filled array in a separate embodiment utilizing an injection molded grid.

FIG. 6 illustrates a further embodiment of the present invention. An injection molded grid array 20 is defined by an integrally formed retainer 18' and reflective light partitions 14' of varying heights. The grid array 20 defines an array of scintillator element cells 22 configured to closely receive one or more scintillator elements 12 in a frictional fit. The grid array 20 is fabricated from pellets formed by blending a combination of polypropylene, titanium dioxide, Teflon® and an optical brightener. No bonding materials or agents are needed to hold the scintillator elements 12 in place inside the grid array 20. Although not clearly visible in the illustrations, an air gap 16 is defined between each scintillator element 12 and the light partitions 14' and retainer 18' of the cell 22 in which it is received. As in the prior embodiments, the air gap 16 maximizes light output as it minimizes loss of light into the reflector material of the grid array 20.

The grid array 20 is manufactured using one or more of a variety of materials including reflective powders, plastics, paints, ceramics, or other highly reflective components. Similarly, the grid array 20 is manufactured using one of a variety of processes including, but not limited to, injection molding, fused deposition modeling, SLA techniques, or hand assembly using reflective materials. The grid array 20 is dimensioned at various lengths and wall 18' thicknesses to accommodate various sized scintillator elements 12. The grid array 20 is constructed to have parallel scintillator element cells 22 or, alternatively, to define scintillator element cells forming an arch (not illustrated).

In one embodiment of the present invention, pellets used in the injection molding process are created using a blend of 20% titanium dioxide (TiO2), 2% Teflon®, 0.2% optical brightener, and polypropylene. The grid array 20 is formed by injecting the pellets using a high pressure injection molding machine and customized dies and tooling to form the grid array 20. The materials of manufacture of the grid array 20 are selected depending on the wavelength of light emitted by the scintillator element 12 in order to achieve the highest degree of reflectance at the chosen wavelength. Materials that have been used singly or in combination include, but are not limited to Titanium dioxide, Barium sulfate, Silicon dioxide, Calcium carbonate, Aluminum oxide, Magnesium oxide, Zinc oxide, Zirconium oxide, Talcum, Alumina, Lumirror®, Teflon® (PTFE), Calcium fluoride, Silica gel, Polyvinyl alcohol, Ceramics, Plastics, and films.

Figure 7:
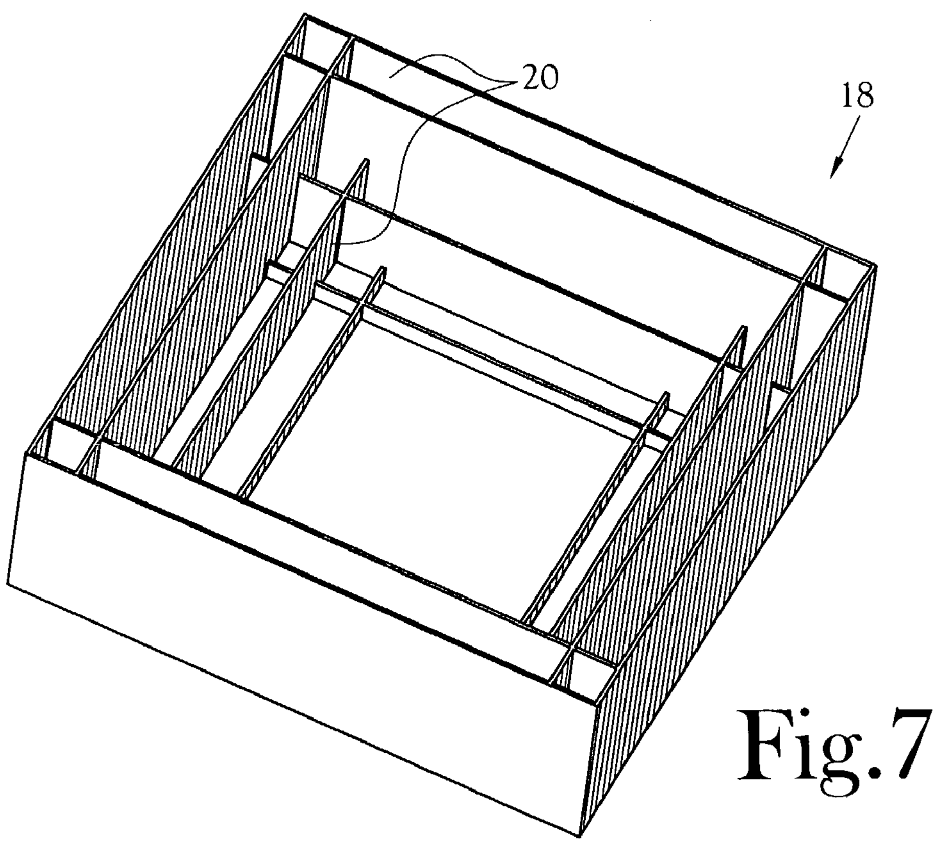
FIG. 7 is a perspective illustration of the injection molded grid without any scintillator elements.

FIG. 7 illustrates the injection molded grid 20 of FIG. 6 without any scintillator elements 12 loaded. In this embodiment, an air gap 16 is maintained between the scintillator elements 12 and the reflective light partition 14' in a similar configuration to that illustrated in FIG. 3.

Figure 8:
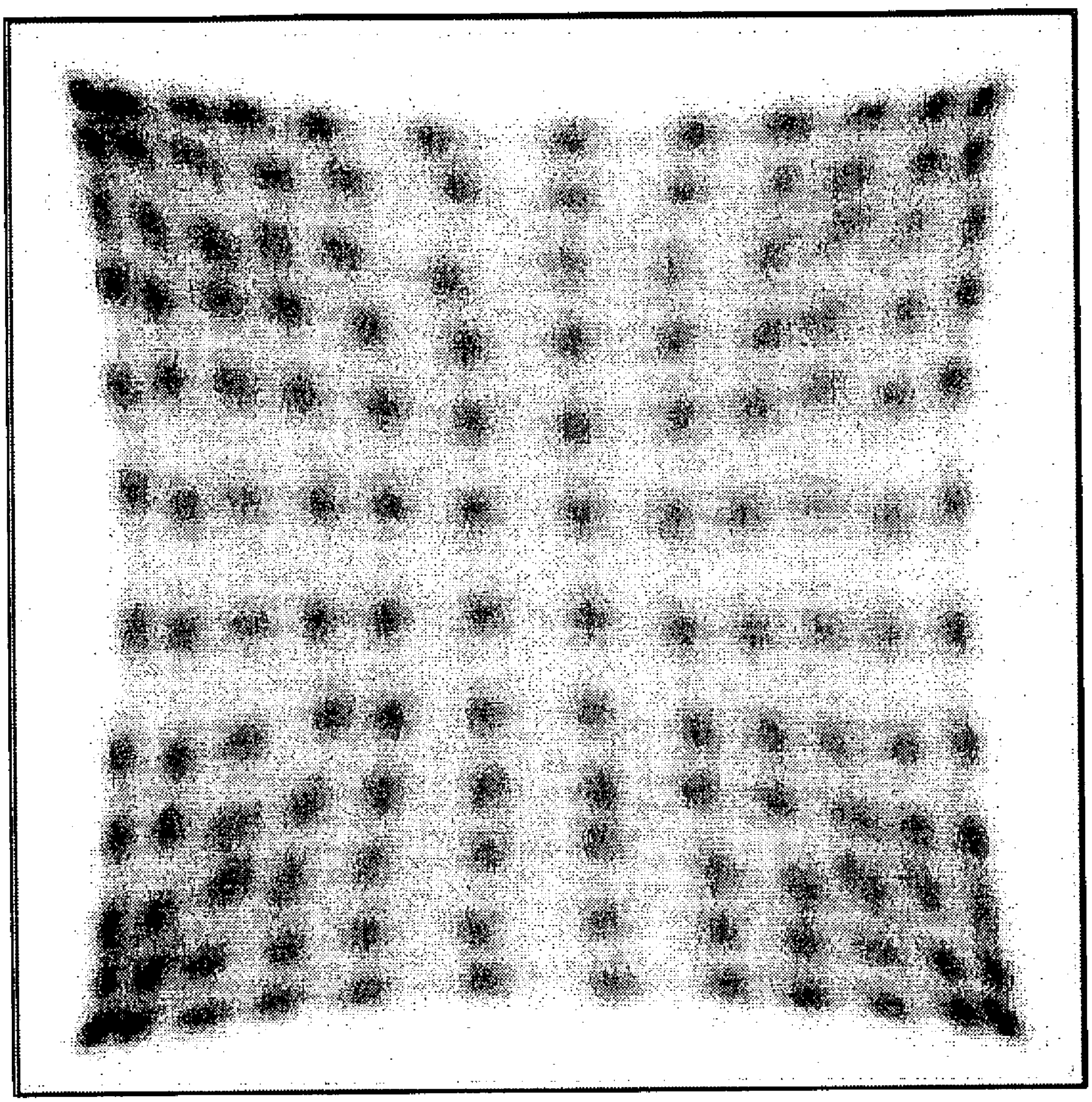
FIG. 8 is a position profile map acquired by flood irradiating the injection molded grid array with a radioactive point source.
Figure 9:
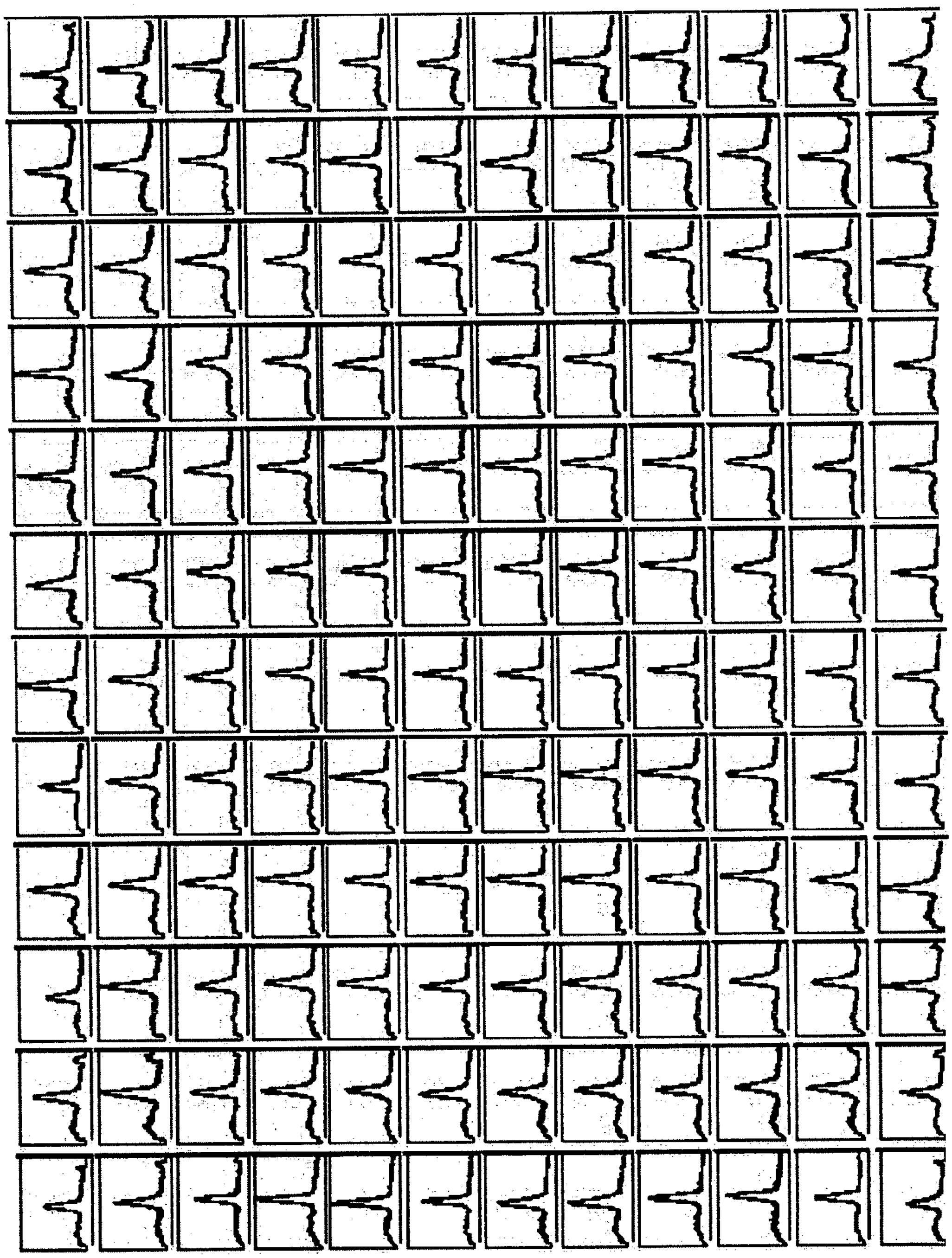
FIG. 9 is an energy resolution map of the array shown in FIG. 8.

FIG. 8 depicts a position profile map obtained with a detector array 10' defined by a 12×12 matrix of scintillator elements 12 when irradiated with a radioactive point source. The individual element resolution map is illustrated in FIG. 9. The average energy resolution across the scintillator elements 12 in the array 20 was measured to be 12%. The light output and energy resolution are maintained while increasing the sensitivity of the detector by increasing the packing fraction of the array.

From the above description, it will be recognized by those skilled in the art, that a method for fabricating an array having high packing fraction and high sensitivity has been disclosed. The array is manufactured using a consistent, cost-effective method. The array is adapted to receive a plurality of scintillators for use in imaging applications such as X-ray imaging, fluoroscopy, positron emission tomography (PET), single photon emission computed tomography (SPECT), computed tomography (CT), gamma camera and digital mammography systems. The array allows an air gap between the scintillator elements, thereby increasing the packing fraction and eliminating the need for a light partition or reflective partition in between the elements. The variable height light partitions—and in an alternate embodiment, the varied transmission properties over the height of the light partitions—allow sufficient light output while controlling cross-talk between the discrete scintillator elements.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparati and methods, and illustrative examples shown and described. Accordingly, departures may be made from such details without departing from the spirit or scope of the general inventive concept.

Having thus described the aforementioned invention, we claim:

1. A detector array for use in association with an imaging device, said detector array comprising:

an M×N array of scintillator elements positioned within the imaging device such that radiation within the imaging device impinges upon said array of scintillator elements, and whereby a location of impingement of radiation within each of said array of scintillator elements is ascertainable;

a plurality of reflective light partitions interposed between selected of said scintillator elements, at least one of said plurality of reflective light partitions defining a first height, and at least one of said plurality of reflective light partitions defining a second height;

an air gap defined between adjacent scintillator elements; and a mechanism for maintaining a relative position of each of said array of scintillator elements with respect to each of said array of scintillator elements.

2. The detector array of claim 1 wherein each of said array of scintillator elements defines a top surface, a bottom surface, and a plurality of side surfaces, and wherein each of said plurality of side surfaces is optimized to a selected degree to define a selected light collection efficiency and to control light sharing between said array of scintillator elements.

3. The detector array of claim 1 wherein said air gap is defined between adjacent of said array of scintillator elements between which no said reflective light partition is positioned, and between said scintillator elements and said plurality of reflective light partitions.

4. The detector array of claim 1 wherein said plurality of reflective light partitions is fabricated from a material selected from the group consisting of at least reflective powders, plastics, paints, polyvinyl alcohol, ceramics, and films.

5. The detector array of claim 4 wherein said plurality of reflective light partitions is fabricated from film, said film being adhered to one side of an adjacent pair of said selected scintillator elements, said air gap being defined between said film and an opposing side of said adjacent pair of said selected scintillator elements.

6. The detector array of claim 4 further comprising a grid array defined by said mechanism for maintaining a relative position of each of said array of scintillator elements with respect to each of said array of scintillator elements and said plurality of reflective light partitions, said grid array defining a plurality of scintillator element cells adapted to receive said array of scintillators.

7. The detector array of claim 6 wherein said array of scintillator elements are received within each of said scintillator element cells without a binding agent, said air gap being defined between each scintillator element and said side wall of said scintillator element cell.

8. The detector array of claim 6, said grid array being fabricated from at least one component selected from the group consisting of at least: reflective powders, plastics, paints, ceramics, titanium dioxide, barium sulfate, silicon dioxide, calcium carbonate, aluminum oxide, magnesium oxide, zinc oxide, zirconium oxide, talcum, alumina, polyethylene terephthalate film, polytetrafluoroethylene (PTFE), calcium fluoride, silica gel, polyvinyl alcohol, and films.

9. The detector array of claim 8 wherein said grid array is fabricated from a composition including 20% titanium dioxide ($TiO_2$), 2% PTFE, 0.2% optical brightener, and polypropylene.

10. The detector array of claim 1 further comprising at least one photodetector, said array of scintillator elements being coupled to said at least one photodetector.

11. The detector array of claim 10 wherein said mechanism for maintaining a relative position of each of said array of scintillator elements with respect to each of said array of scintillator elements is a bonding agent for bonding each of said array of scintillator elements to said at least one photodetector.

12. The detector array of claim 10 wherein said at least one photodetector is selected from the group consisting of at least a photomultiplier tube, a position sensitive photomultiplier tube, an avalanche photodiode, a pin diode, a CCD, and a solid state detector.

13. The detector array of claim 10 further comprising a light guide disposed between said array of scintillator elements and said at least one photodetector, said scintillator elements being coupled to said at least one photodetector via said light guide.

14. The detector array of claim 13 wherein said mechanism for maintaining a relative position of each of said array of scintillator elements with respect to each of said array of scintillator elements is a bonding agent for bonding each of said array of scintillator elements to said light guide.

* * * * *